(12) United States Patent
Natroshvili et al.

(10) Patent No.: US 9,536,306 B2
(45) Date of Patent: Jan. 3, 2017

(54) VEHICLE VISION SYSTEM

(75) Inventors: Koba Natroshvili, Waldbronn (DE); Stefan Vacek, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 801 days.

(21) Appl. No.: 13/527,361

(22) Filed: Jun. 19, 2012

(65) Prior Publication Data

US 2013/0002871 A1  Jan. 3, 2013

(30) Foreign Application Priority Data

Jun. 30, 2011 (EP) .................................. 11172195

(51) Int. Cl.
*H04N 17/00* (2006.01)
*G06T 7/00* (2006.01)

(52) U.S. Cl.
CPC ... *G06T 7/0018* (2013.01); *G06T 2207/30256* (2013.01)

(58) Field of Classification Search
CPC .................... G06T 7/0018; G06T 2207/30256
USPC ......................................................... 348/148
See application file for complete search history.

(56) References Cited

U.S. PATENT DOCUMENTS

| | | | |
|---|---|---|---|
| 2002/0027651 A1 | 3/2002 | Jackson et al. | |
| 2003/0021490 A1 | 1/2003 | Okamoto et al. | |
| 2008/0031514 A1* | 2/2008 | Kakinami | G06T 7/0018 382/154 |
| 2008/0231710 A1 | 9/2008 | Asari et al. | |
| 2009/0042173 A1 | 2/2009 | Jaxzlies et al. | |
| 2010/0079590 A1* | 4/2010 | Kuehnle | G06K 9/00798 348/118 |
| 2010/0266161 A1* | 10/2010 | Kmiecik | G01C 21/26 382/103 |

(Continued)

FOREIGN PATENT DOCUMENTS

| | | |
|---|---|---|
| EP | 1 302 365 A1 | 4/2003 |
| EP | 2 192 552 A1 | 6/2010 |

(Continued)

OTHER PUBLICATIONS

European Search Report for European Patent Application No. 11 003 828.8, 8 pgs., Sep. 22, 2011.

(Continued)

*Primary Examiner* — Dave Czekaj
*Assistant Examiner* — Berteau Joisil
(74) *Attorney, Agent, or Firm* — Alleman Hall McCoy Russell & Tuttle LLP

(57) ABSTRACT

In order to determine extrinsic parameters of a vehicle vision system or an aspect of a vehicle vision system, road lane markings may be identified in an image captured by a camera and provided to the vehicle vision system. For one or more of the identified road lane markings, a first set of parameters defining an orientation and a position of a line along which a road lane marking extends in an image plane may be determined. Also, a second set of parameters defining an orientation and a position of a line along which a road lane marking extends in a road plane may be determined. A linear transformation that defines a mapping between the first set of parameters and the second set of parameters may be identified. The extrinsic parameters may be established based on the identified linear transformation.

20 Claims, 11 Drawing Sheets

(56) References Cited

U.S. PATENT DOCUMENTS

2011/0115922 A1   5/2011   Shimizu

FOREIGN PATENT DOCUMENTS

| EP | 2 200 311 A1 | 6/2010 |
|---|---|---|
| EP | 2 234 399 A1 | 9/2010 |
| EP | 2 285 109 A1 | 2/2011 |

OTHER PUBLICATIONS

European Search Report from corresponding European Application No. 11 16 8355, Oct. 27, 2011.
European Search Report from corresponding European Patent Application No. 11172195.7-2218, Dec. 12, 2011.
Extended European Search Report issued in European Patent Application No. 11162470.6, (7 pgs.), dated Aug. 18, 2011.
European Search Report issued in European patent application No. 11176707.5-1523, 6pp., Dec. 29, 2011.
Chen, Y.Y. et al., "An Embedded System for Vehicle Surrounding Monitoring," 2009 $2^{nd}$ International Conference on Power Electronics and Intelligent Transportation System, *IEEE*, Piscataway, NJ, USA, Dec. 19, 2011, XP031624185, pp. 92-95.
Gandhi, Tarak et al., "Vehicle Surround Capture: Survey of Techniques and a Novel omni-Video-Based Approach for Dynamic Panoramic Surround Maps", *IEEE Transactions on Intelligent Transportation Systems*, 2006, vol. 7, No. 3, XP-002659721, pp. 293-308.
Liu, Y.C. et al., "Bird's-Eye View Vision System for Vehicle Surrounding Monitoring," in Robot Vision, Jan. 1, 2008, Springer Berlin Heidelberg, Berlin, Heidelberg, XP55004046, pp. 207-218.
Tsai, Roger Y., "A Versatile Camera Calibration Technique for High-Accuracy 3D Machine Vision Metrology Using Off-The-Shelf TV Cameras and Lenses", *IEEE Journal of Robotics and Automation*, 1987, vol. 3, No. 4, pp. 323-344.
Tsai, Roger Y., "An Efficient and Accurate Camera Calibration Technique for 3D Machine Vision", *Proceedings of IEEE Conference on Computer Vision and Pattern Recognition*, Miami Beach, FL, 1986, pp. 364-374.
Zhang, Z., "A Flexible New Technique for Camera Calibration", *IEEE Transactions on Pattern Analysis and Machine Intelligence*, 2000, vol. 22, No. 11, pp. 1330-1334.
Perdersini F., et al.,"Accurate and Simple Geometric Calibration of Multi-Camera Systems", Signal Processing, Elsevier Science Publishers B.V. Amsterdam, NL, vol. 77, No. 3, pp. 309-334, Sep. 1, 1999.
Forbes et al., "An Inexpensive, Automatic and Accurate Camera Calibration Method", Proceedings of the Thirteenth Annual South African Workshop on Pattern Recognition, 2002.
Stefan Vacek et al., "Road-Marking Analysis for Autonomous Vehicle Guidance", Online Proceedings of the 3rd European Conference on Mobile Robots, pp. 1-9, Sep. 19, 2007.
Douret J. et al., "A Volumetric Multi-Cameras Method Dedicated to Road Intelligent Vehicles Symposium", 2004 IEEE, pp. 442-446, Parma, Italy Jun. 17-17, 2004, Piscataway, NJ, USA IEEE Jun. 14, 2004.
Kunfeng Wang et al., "Research on Lane-Marking Line Based Camera Calibration", Vehicular Electronics and Safety, 2007, ICVES, IEEE International Conference on, IEEE, Piscataway, NJ, pp. 1-6, Dec. 13, 2007.

* cited by examiner

VEHICLE VISION SYSTEM

PRIORITY CLAIM

This application claims the benefit of priority from European Patent Application No. 11 172 195.7, filed Jun. 30, 2011, which is incorporated by reference.

BACKGROUND OF THE INVENTION

1. Technical Field

The present invention relates to a vehicle vision system that may include a calibration system.

2. Related Art

Use of image sensors in vehicle systems has become widespread. Such image sensors may be used as components of a driver assistance system in which the image sensors capture images of a vehicle's surroundings. The captured images may be processed to perform object recognition. Also, the images may be displayed, possibly after processing, to a user. Automatic warning and assistance functions may be performed to warn the driver of potentially dangerous situations or to actively control operation of the vehicle, such as actuating breaks of the vehicle. Image sensors may also be employed as rear view or side view cameras that may help the driver with operating the vehicle, such as parking the vehicle.

With the use of image sensors in vehicle systems becoming increasingly popular, the complexity and time involved to calibrate the vehicle vision system can be an important consideration. Calibrating a vehicle vision system involves extrinsic and intrinsic parameters to be known. While intrinsic parameters may remain constant over time, this may not be the case for extrinsic parameters. For example, orientation of a camera may change over time for various reasons, such as continued operation of the vehicle may cause the orientation of the camera to vary. Because extrinsic parameters change, it may be desired to calibrate a vehicle vision system periodically.

SUMMARY

A system, such as a calibration system, which may determine extrinsic parameters of a vehicle vision system and an aspect(s) of the vehicle vision system, such as a camera. The system may perform processing of an image of a road captured by a camera of the vehicle vision system to identify a first road lane marking and a second road lane marking in the image, where the two road lane markings extend parallel to each other. The system may also determine, for at least one of the two road lane markings: a first set of parameters defining an orientation and a position of a line along which the at least one of the two road lane markings extends in an image plane; and a second set of parameters defining an orientation and position of a line along which the at least one of the two road lane markings extends in a road plane, where the second set of parameters are determined based on information related to spacing of the two road lane markings. The system may also identify a linear transformation, which, for at least one of the two road lane markings, defines a mapping between the first set of parameters and the second set of parameters. Further, the system may establish the extrinsic parameters based on the identified linear transformation, where the established extrinsic parameters include an orientation of the camera.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
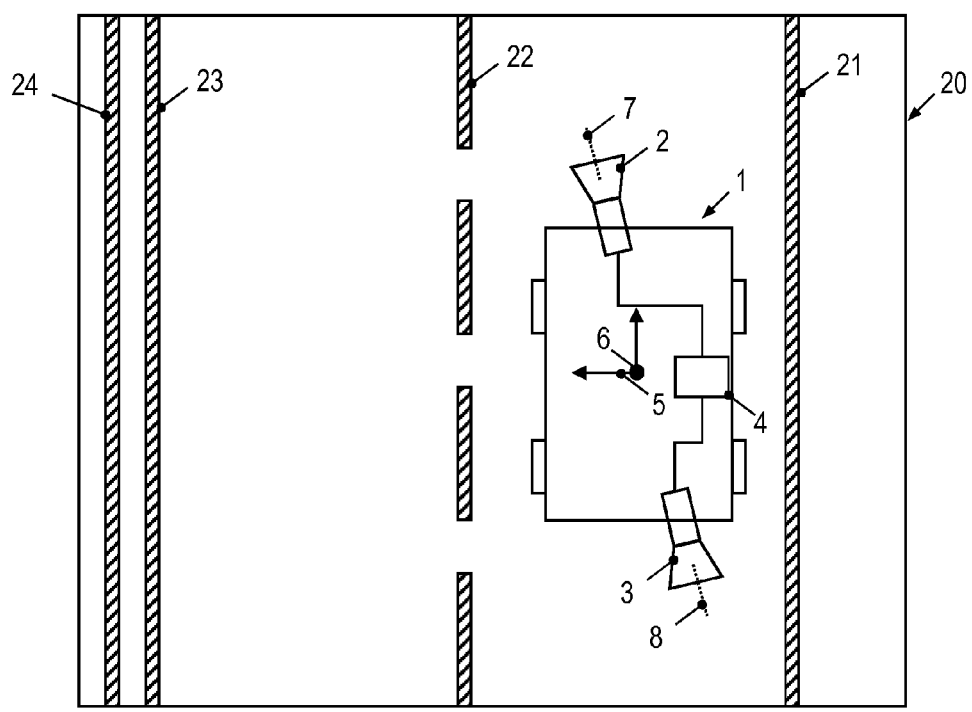
FIG. 1 is a schematic view of an example vehicle equipped with an example vehicle vision system and positioned on a road having road lane markings.

One approach to determine extrinsic parameters includes positioning markers at predefined positions relative to a vehicle, determining a position of the markers in an image plane of a camera of the vehicle vision system of the vehicle, and determining parameters of a linear mapping that maps object coordinates in a vehicle coordinate system onto object coordinates in the image plane of the camera (where the vehicle coordinate system may be an aspect of the vehicle vision system). Such an approach may be based on a mapping between three-dimensional coordinates of a point in a world coordinate system and two-dimensional coordinates in the image plane of the camera. Such an approach may involve continual recalibration of the vision system by a service professional and positioning of the markers with precision. This may constrain the frequency of calibration of the vehicle vision system, and the determination of the extrinsic parameters.

Therefore, a calibration system for determining extrinsic parameters of a vehicle vision system (or an aspect(s) of the vehicle vision system) that does not involve predefined markers may be beneficial. It may also be beneficial for the calibration system to be able to determine the extrinsic parameters during operation of the vehicle, such as when the vehicle is moving.

The calibration system may be a part of a vehicle vision system, and the vehicle vision system may be installed in a vehicle and may include one or more cameras. One or more images of a road captured by a camera of the vision system may be processed to identify road lane markings in the one or more images. The road lane markings may extend parallel to each other in a road plane, for example. For one or more of the road lane markings, a first set of parameters and a second set of parameters may be determined by the calibration system, for example. The first set of parameters may define orientation and position of a line along which a road lane marking extends in an image plane of the one or more images. The second set of parameters may define orientation and position of a line along which a road lane marking extends in a road plane. The second set of parameters may be determined by the calibration system based on information on spacing of the road lane markings in the road plane. A linear transformation may define, for one or more of the road lane markings, a mapping between the first set of parameters and the second set of parameters. The extrinsic parameters include or may be established based on the linear transformation. Further, the extrinsic parameters may include orientation of the camera of the vehicle vision system.

One aspect of the calibration system may include software, hardware, and/or firmware that performs a method for determining extrinsic parameters of a vehicle vision system or an aspect(s) of the vehicle vision system. The method may include determining a linear mapping (e.g., determining a linear transformation) between a first parameter set and a second parameter set that define lines in the image plane and the road plane, respectively. The method then may include determining the extrinsic parameters based on the linear mapping. Road lane markings may serve as markings for defining the lines in the determining of the linear mapping.

The extrinsic parameters may also be based on a linear transformation where the extrinsic parameters define at least an orientation of the camera of the vehicle vision system (which may be a camera of a vehicle coordinate system of the vehicle vision system).

The first set of parameters may include parameters that may be organized in an n-tuple where n>1. The second set of parameters may include parameters that may also be organized in an n-tuple where n>1.

Further, considering the linear mapping, which defines the lines in the image plane and road plane, respectively, the determination of the extrinsic parameters may be insensitive to a longitudinal position of the vehicle or a longitudinal direction of a road along which the vehicle may be moving. However, information on the location of road lane markings in a transverse direction of the road may be determined using a map database that may be included in a vehicle vision system or another vehicle system, such as a vehicle navigation system. The map database may include information on lane widths, for example. The map database may also include information on functional road classes that can be associated with road lane widths. This information may also be used in determining the extrinsic parameters mentioned above, without requiring measurements related to locations of the road lane markings upon calibration (e.g., calibration by the calibration system) of the vehicle vision system.

The first set of parameters may include coefficients of a bilinear equation that are related to image plane coordinates, which may define a line along which a respective road lane marking extends in the image plane. The second set of parameters may include coefficients of a bilinear equation that are related to road plane coordinates, which may define the line along which a respective road lane marking extends in the road plane.

The method may also include determining matrix elements of a homography matrix to identify the linear transformation. The matrix elements of a matrix that describes a linear mapping between the coefficients of a bilinear equation that relates to the line along which the respective road lane marking extends in the image plane and the coefficients of another bilinear equation that relates to the line along which the respective road lane marking extends in the road plane. These elements may be matrix elements of the homography matrix. The homography matrix may define a mapping between points in a world coordinate system of the vehicle and the image plane.

The matrix elements of the homography matrix may be determined such that:

$$H^T \vec{p}'_i \quad (1)$$

approximates $\vec{p}_i$ for every i=1, ..., M, where i denotes an integer identifier for a road lane marking, M denotes a total count of the road lane markings, H denotes a homography matrix having three rows and three columns, the superscript T denotes the matrix transpose, the vector $\vec{p}'_i$ denotes a 3-tuple of the first set of parameters identified for the $i^{th}$ road lane marking, and the vector $\vec{p}_i$ denotes a 3-tuple of the second set of parameters identified for the $i^{th}$ road lane marking.

Aspects calibration system may use various criteria and techniques to ensure that $H^T \vec{p}'_i$ approximates $\vec{p}_i$ for i=1, ..., M, depending on the number of unknown extrinsic parameters on which the homography matrix H depends and the count M of road lane markings. For example, where the number of unknown extrinsic parameters on which H depends may be equal to 2·M, $H^T \vec{p}'_i = \vec{p}_i$ may be enforced by the calibration system. Where the number of unknown extrinsic parameters on which H depends may be less than 2·M, an over-determined set of equations results. A wide variety of techniques, such as least square approximation, may be used to determine the matrix elements of H in this case.

Determining the first set of parameters may include determining parameter values $a'_i$, $b'_i$ and $c'_i$ such that the line along which the road lane marking extends in the image plane may be defined by:

$$a'_i x' + b'_i y' + c'_i = 0, \quad (2)$$

where i denotes an integer road lane marking identifier and x' and y' denote coordinates in the image plane. The bilinear equation (2) also defines a line in the image plane.

Determining the second set of parameters may include determining parameter values $a_i$, $b_i$, and $c_i$ such that the line along which the road lane marking extends in the road plane may be defined by:

$$a_i x + b_i y + c_i = 0, \quad (3)$$

where x and y denote coordinates in the road plane. The bilinear equation (3) also defines a line in the image plane.

Also, where the second set of parameters are determined according to Equation (3), the parameter values $a_i$ or $b_i$ may be set equal to zero, and the other parameter value may be set to include a value that may be determined based on the information on the spacing of the road lane markings. The quotient of $c_i$ may also be set to include a value that may be determined based on the information on the spacing of the road lane markings. The offset of the road lane markings in a world coordinate system of the vehicle may be determined by the spacing of road lane markings. This allows the second set of parameters to be determined using information on the spacing.

The matrix elements of the homography matrix may be determined based on the values of:

$$N\left[H^T\begin{pmatrix} a'_i \\ b'_i \\ c'_i \end{pmatrix} - \begin{pmatrix} a_i \\ b_i \\ c_i \end{pmatrix}\right], \quad (4)$$

for i=1, ..., M, where N[•] denotes a vector norm and M denotes a total count of the road lane markings used in the calibration. The vector norm NH may be any norm, such as $L_2$ or another $L_p$ norm. The matrix elements of the homography matrix may be determined such that the sum of the results of Equation (4) for i, $$\sum_{i=1}^{M} N\left[H^T\begin{pmatrix} a'_i \\ b'_i \\ c'_i \end{pmatrix} - \begin{pmatrix} a_i \\ b_i \\ c_i \end{pmatrix}\right], \quad (5)$$

may be minimized. Alternatively, the matrix elements of the homography matrix may be determined such that the result of Equation (5) may be less than a threshold. For increased accuracy, the count M of road lane markings used in the method may be selected to be greater than the number of unknown extrinsic parameters in the homography matrix divided by two. While the homography matrix H having three rows and three columns has nine matrix elements, the number of unknown extrinsic parameters may be less than or equal to six. Where orientation of a camera of the vehicle vision system relative to the vehicle may be unknown, it may be sufficient for the vision system to determine three coordinates defining the orientation.

The matrix elements of the homography matrix may be determined such that:

$$\sum_{i=1}^{M} \left\| H^T\begin{pmatrix} a'_i \\ b'_i \\ c'_i \end{pmatrix} - \begin{pmatrix} a_i \\ b_i \\ c_i \end{pmatrix}\right\|^2 \quad (6)$$

may be minimized. For increased accuracy, the count M may be selected to be greater than the number of unknown extrinsic parameters in the homography matrix divided by two.

The matrix elements of the homography matrix may be determined such that, for i=1, ..., M, $$H^T\begin{pmatrix} a'_i \\ b'_i \\ c'_i \end{pmatrix} = \begin{pmatrix} a_i \\ b_i \\ c_i \end{pmatrix}. \quad (7)$$

Where the number of unknown extrinsic parameters on which H depends is equal or less than M/2, the condition of Equation (7) may allow the extrinsic parameters to be determined as well.

With respect to Equation (3), for one or more of the road lane markings, the quotient of $c_i$ and the other one of the parameter values $a_i$ or $b_i$ may be set equal to:

$$(2 \cdot k(i)+1) \cdot l/2 + s, \quad (8)$$

where k(i) denotes an integer number that depends on the road lane marking identifier, l denotes a road lane width, and s denotes a value independent on the road lane marking identifier. The value s may be an offset of the vehicle from the middle of a road lane. The value s may be determined from one or more captured images, captured by a camera of the vehicle vision system. Also, the value s may be set equal to zero to correspond to a vehicle that is in the middle of a road lane. Based on Equation (8), the lines along which road lane markings extend in the road plane may be parameterized. For example, the road lane markings that delimit the lane on which the vehicle may be driving may be parameterized by setting k(i) equal to zero and to −1, respectively. Where the longitudinal direction of the vehicle is defined to be the x-axis, the parameter values $a_i$ may be equal to 0 and $c_i/b_i$ may be given by Equation (8). Where the longitudinal direction of the vehicle is defined to be the y-axis, the parameter values $b_i$ may be equal to 0 and $c_i/a_i$ may be given by Equation (8).

The road lane markings may include at least two road lane markings that extend parallel to each other in the road plane. Further, where there are at least three road lane markings and coordinates of a camera are unknown, the coordinates may also be determined.

A count M of the road lane markings and a count $M_e$ of the extrinsic parameters which may be to be determined, may satisfy:

$$M_e \leq 2 \cdot M. \quad (9)$$

The road lane markings, which may be identified and used by the vehicle vision system or the calibration system, may be selected so that all unknown extrinsic parameters may be determined by the calibration system too. The count M of the road lane markings and the count $M_e$ of the extrinsic parameters, which may be determined by the calibration system, may be set such that $M_e=2 \cdot M$.

The identified road lane markings may not need to be simultaneously visible in an image. For example, one road lane marking may be visible in an image captured by the camera of the vehicle vision system, and at least one other road lane marking may be visible in another image captured by the camera.

The information on the spacing of road lane markings may be a fixed value stored in a memory. For example, in various countries, road lanes have a characteristic width that may be predetermined by legal regulations. For example, road lanes in Germany may have a characteristic width of 3.6 meters. Such information may be used to determine the second set of parameters.

Also, an averaging procedure may be performed by the calibration system too over a plurality of images when determining the first set of parameters. For at least one road lane marking, a line along which the road lane marking extends may respectively be determined for one or more images of the plurality images. Parameters that describe the line, for example according to Equation (2), may be determined for at least one of the images. Also, the coefficients of the bilinear equation determined for the images may be averaged to define the first set of parameters used in any one of Equations (4)-(7). Alternatively, matrix elements of the homography matrix may be determined individually for at least one of the images, and the resulting extrinsic parameters or matrix elements of the homography matrix may be averaged by the calibration system too.

According to an aspect of the vehicle system, a method of processing images captured by a camera of a vehicle vision system is described herein. The extrinsic parameters and parameters related to the extrinsic parameters of the vehicle vision system and an aspect(s) of the vehicle vision system may be determined in a calibration procedure (such as a calibration procedure performed by the calibration system). In subsequent operations, images captured by the camera may be processed based on the determined extrinsic parameters. The processing of the images based on the determined extrinsic parameters may include any one or any combination of: determining parameters for visually outputting captured images via a display; determining locations at which graphical markings may be overlaid on a captured image when the captured image may be outputted via a display; and processing the image for driver assistance functions.

The calibration procedure may be initiated by a user command or automatically, such as after predetermined time intervals or where a change in the extrinsic parameters may be automatically detected.

According to another aspect of the vehicle vision system, the system may include a processing unit and a camera having an electro-optical component to capture images. The processing unit may be configured to process image data received from the camera. The processing unit may be configured to process one or more images of a road captured by the camera to identify road lane markings in the one or more images. The processing unit may be configured to determine, for at least one of the identified road lane markings, a first set of parameters and a second set of parameters. The first set of parameters defines an orientation and position of a line along which the road lane marking extends in an image plane of the one or more images. The second set of parameters defines an orientation and position of a line along which the road lane marking extends in the road plane. The processing unit may be configured to determine the second set of parameters based on information on spacing of the road lane markings in the road plane. Also, the processing unit may be configured to identify a linear transformation. The transformation, for at least one of the road lane markings, defines a mapping between the first set of parameters and the second set of parameters. The processing unit may also be configured to establish the extrinsic parameters based on the linear transformation and prior determined extrinsic parameters defining at least an orientation of the camera.

Further, the processing unit may be configured to establish the extrinsic parameters based on the linear transformation such that the established extrinsic parameters define at least an orientation of a camera in a vehicle coordinate system, e.g., in a coordinate system of a vehicle in which the vehicle vision system may be installed.

Also, the vehicle vision system may include an output device. Also, an image processing unit coupled to the output device may be configured to use the determined extrinsic parameters when outputting information based on images captured by a camera of the vehicle vision system.

In addition, aspects of the vehicle vision system may be combined with driver assistance functions, such as rear view systems and surround view systems.

While some examples of the vehicle vision system will be described in specific contexts, other examples may be not limited to these specific contexts. Terms such as "forward", "front", "rearward", "rear", or "side" as used in the context of the vehicle vision system relate to the vehicle reference frame. For example, the "forward" direction may be the direction visible to the driver through the windshield.

FIG. 1 is a schematic view showing an example vehicle 1 positioned on an example road 20. The vehicle 1 includes a vehicle vision system. The vehicle vision system may include a camera 2. The vehicle vision system may include one additional camera 3 or a plurality of additional cameras. At least one of the cameras 2 or 3 of the vehicle vision system may be arranged such that captured images show a road 20 on which the vehicle 1 may be located in at least a section of a captured image. The vehicle vision system may also include a processing device 4. The processing device 4 may be coupled to an electro-optical component of the camera 2 or 3 of the vehicle vision system and may be configured to process image data received from the electro-optical component, which may be an electro-optical sensor. For example, each camera 2 or 3 may include a charge-coupled device (CCD) sensor or another type of electro-optical sensor to convert optical images into image data. The processing device 4 may include one or more processors that may be configured to execute program code to determine the extrinsic parameters according to any one of the methods described herein.

The extrinsic parameters may include the position and orientation of the camera 2 in a vehicle coordinate system 5, for example. The extrinsic parameters may also include the position and orientation of one or more other cameras in the vehicle coordinate system 5. The position of a camera in the vehicle coordinate system 5 may be defined by three coordinates of a characteristic point of the camera relative to an origin 6 of the vehicle coordinate system. The origin 6 may be located at the center of the vehicle 1. A characteristic point defining a position of the camera 2, for example, may be the center of the electro-optical sensor or the point at which an optical axis intersects an optical component of the camera. The orientation of a camera may be defined by the orientation of a characteristic axis of the camera relative to the vehicle coordinate system 5. Further, a characteristic axis may be an optical axis of a camera. The orientation may be defined by three angles or any other equivalent description of an orientation in space. To illustrate orientation, the axis 7 of the camera 2 and the axis 8 of the camera 3 are depicted in FIG. 1.

The vehicle vision system may be configured such that at least the orientation of a camera, such as camera 2, may be automatically determined in a calibration procedure, such a calibration procedure performed by the calibration system. The processing unit 4 may be configured to use road lane markings 21-23 which extend in parallel on the road 20 as markings. Translational invariance along the longitudinal direction of the road allows the extrinsic parameters to be determined without having to position the vehicle at a predetermined position relative to start or endpoints of road lane markings. Also, as depicted, there may be additional road lane markings 24 that may not be considered when determining the extrinsic parameters.

In order to determine extrinsic parameters of camera 2, for example, the processing unit 4 may be configured to identify lines in an image plane of the camera along which the road lane markings extend in the image plane. The processing unit 4 may be configured to determine for one or more of the lane markings, respectively, a first set of parameters associated with a respective line. The first set of parameters may be a 3-tuple of coefficients of a bilinear equation related to image plane coordinates that define the respective line in the image plane.

The processing unit 4 may be configured to determine for one or more of the road lane markings, respectively, a second set of parameters that define a line along which the road lane marking extends in a road plane. The second set of parameters may be a 3-tuple of coefficients of a bilinear equation related to the road plane coordinates that define the respective line in the road plane.

The processing unit 4 may be configured to determine elements of a homography matrix having three rows and three columns, which defines a mapping between the first set of parameters and the second set of parameters to determine at least an orientation of a respective camera. The processing unit 4 may also be configured to determine a position of the respective camera.

Where the extrinsic parameters are determined based on parameters that define an orientation and position offset of lines in the image plane and of corresponding lines in the road plane, a more accurate determination of extrinsic parameters may be possible. Also, the calibration may be performed selectively by the calibration system, for example, when the processing unit 4 determines that the vehicle may be driving on a road having known road lane widths. Such a determination may be made based on a current location of the vehicle and based on whether a road lane width is stored in a map database or whether the road lane width can be determined from other information available for the road, such as a functional road class (FRC) of the road.

The vehicle vision system of the vehicle 1 may be coupled to a driver assistance system. Further, the extrinsic parameters established for the vehicle vision system or an aspect(s) of the vehicle vision system may be used when processing images captured by a camera of the vehicle vision system.

Figure 2:
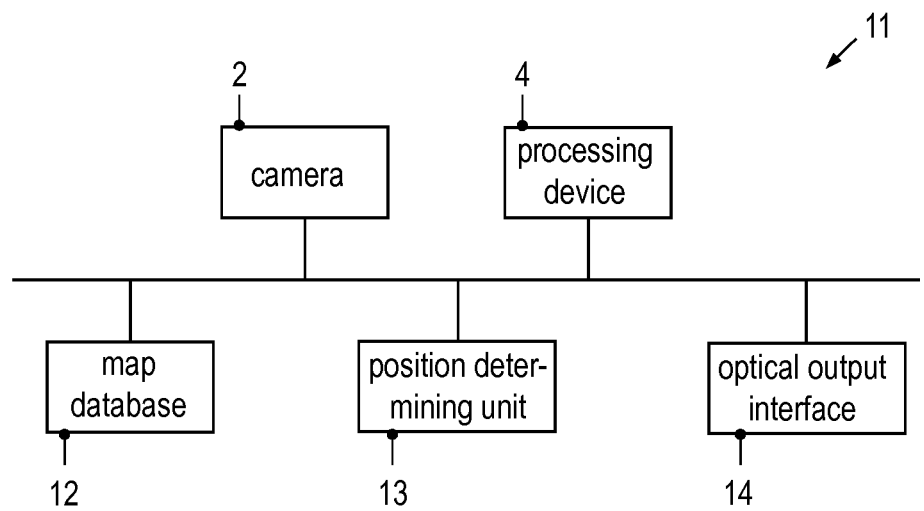
FIG. 2 is a schematic block diagram of an example driver assistance system including an example vehicle vision system.

FIG. 2 is a schematic block diagram of an example driver assistance system 11. The driver assistance system 11 may be installed in a vehicle. The driver assistance system 11 includes a vehicle vision system, which includes the camera 2 and the processing unit 4.

The driver assistance system 11 may include additional components such as a map database 12 stored in a storage device, a position determining unit 13, and a visual output interface 14. The processing unit 4 may retrieve information on a current vehicle location from the position determining unit 13. The position determining unit 13 may be a GPS device. Based on the information on a current vehicle location, the processing unit 4 may access the map database 12 to determine information on a road lane width for a road segment on which the vehicle may be located. Further, the processing unit 4 may use the information on a road lane width in determining the extrinsic parameters.

The processing unit 4 may be coupled to the visual output interface 14. After extrinsic parameters have been determined, the processing unit 4 may control the outputting of visual information via the visual output interface 14 based on the determined extrinsic parameters.

Methods of determining the extrinsic parameters will be described in more detail below. A method for determining the extrinsic parameters may be performed by the processing unit 4 of the vehicle vision system, which may include the calibration system, for example.

Where a camera of the vehicle vision system includes optical components that give rise to non-linear image distortions, such as fish-eye distortions or other non-linear radial or cylindrical distortions, the distortions may be corrected using known intrinsic parameters of the camera.

Below, reference to captured images may include images that have undergone pre-processing to correct non-linear distortions.

The optical mapping between spatial coordinates of a world coordinate system of a vehicle and image points in an image plane of a camera of a vehicle vision system may be described by a camera matrix. When homogeneous coordinates may be used, the camera matrix may be represented as a matrix having three rows and four columns, for example. In mapping between spatial coordinates, such as spatial coordinates in a vehicle reference frame and image points in an image plane can be represented as:

$$\begin{pmatrix} x' \\ y' \\ w' \end{pmatrix} = H_{3 \times 4} \begin{pmatrix} x \\ y \\ z \\ 1 \end{pmatrix}, \text{ for example.} \quad (10)$$

In Equation (10), $H_{3 \times 4}$ may be the camera matrix, represented by:

$$H_{3 \times 4} = \begin{pmatrix} h_{11} & h_{12} & h_{13} & h_{14} \\ h_{21} & h_{22} & h_{23} & h_{24} \\ h_{31} & h_{32} & h_{33} & h_{34} \end{pmatrix}, \text{ for example.} \quad (11)$$

The coordinates x, y, z on the right-hand side of Equation (10) denote coordinates in a world reference frame of the vehicle. An origin of the world reference frame may be located in a road plane, such that points on the road plane have a z-coordinate of 0.

The vector on the left-hand side of Equation (10) includes x' and y', which represent image plane coordinates when normalized by w'.

For a point in the road plane, z=0, the point may be mapped onto the image plane according to:

$$\begin{pmatrix} x' \\ y' \\ w' \end{pmatrix} = H_{3 \times 4} \begin{pmatrix} x \\ y \\ 0 \\ 1 \end{pmatrix} = H \begin{pmatrix} x \\ y \\ 1 \end{pmatrix}, \text{ for example.} \quad (12)$$

In Equation (12), H denotes a homography matrix that defines a mapping between the road plane and the image plane.

In combining Equation (12) with Equation (11), $$H = \begin{pmatrix} h_{11} & h_{12} & h_{14} \\ h_{21} & h_{22} & h_{24} \\ h_{31} & h_{32} & h_{34} \end{pmatrix}. \quad (13)$$

The matrix elements of the homography matrix depend on extrinsic parameters and intrinsic parameters, such as focal length(s). The intrinsic parameters may be known, for example from an initial calibration of the vehicle vision system by the calibration system, for example.

A line in the road plane may be defined by:

$$a \cdot x + b \cdot y + c = 0. \quad (14)$$

Equation (14) is a bilinear equation with coordinates x and y in the road plane. Three coefficients a, b and c define the orientation and position of the line in the road plane. The position of the line may be understood to be a position offset of a line from the origin of a coordinate system measured along an x- or y-axis, e.g., an intersection point of the line with one of the coordinate axes. One of the coefficients a, b and c may be set to any non-zero number, since the multiplication of Equation (14) by any non-zero number may define the same line in the road plane.

Where the camera does not have non-linear distortions, or after non-linear distortions in the image have been corrected by the calibration system, for example, a line located in the road plane may be mapped onto another line in the image plane. This line in the image plane may be described by the bilinear equation:

$$a'x+b'y+c'=0. \tag{15}$$

Equation (15) may be a bilinear equation with coordinates x' and y' in the image plane. Three coefficients a', b' and c' define orientation and position of the line in the image plane. One of the coefficients may be set to any non-zero number, since the multiplication of Equation (15) by any non-zero number may define the same line in the image plane.

Where Equation (15) is the line into which the line defined by Equation (14) is mapped when recording an image, the coefficients a, b, and c defining the line in the road plane and the coefficients a', b' and c' may be related, such as:

$$H^T \begin{pmatrix} a' \\ b' \\ c' \end{pmatrix} = \begin{pmatrix} a \\ b \\ c \end{pmatrix}. \tag{16}$$

In Equation (16), H denotes the homography matrix defined in Equations (12) and (13). The superscript T denotes matrix transposition. The homography matrix H that defines mapping between point coordinates in the road plane and image plane in accordance with Equation (12) defines, after transposition, a linear transformation between the 3-tuple of coefficients (a', b', c') and the 3-tuple of coefficients (a, b, c). The 3-tuple of coefficients (a', b', c') may be a first set of parameters that define the orientation and position of the line in the image plane. The 3-tuple of coefficients (a, b, c) may be a second set of parameters that define the orientation and position of the corresponding line in the road plane.

While a mapping between the 3-tuples of coefficients of the bilinear equations (14) and (15) is illustrated by Equation (16), there may be a variety of formulations. For example, the lines in the road plane and in the image plane may be defined, respectively, by an angle and an offset value.

In one embodiment of the vehicle vision system, road lane markings may be used by the calibration system, for example, to determine the extrinsic parameters. For a straight road segment, the road lane markings may define lines in the road plane and in the image plane. For one or more of the road markings that are in parallel with the road plane, the parameters defining the line in the image plane and the parameters defining the line in the road plane may be determined. Based on Equation (16), extrinsic parameters may be determined using the coefficient vectors on the right-hand side and on the left-hand side of Equation (16).

The number of road lane markings that calibration system may use to determine the extrinsic parameters may be selected by the calibration system based on the number of extrinsic parameters that are unknown. Six extrinsic parameters may be ample to determine a position and orientation of a camera. Where the position of a camera is known, three extrinsic parameters defining the orientation of the camera may be sufficient. The total count M of road lane markings used by the calibration, and the number of extrinsic parameters which may be determined, may be selected such that:

$$M_e \leq 2 \cdot M, \tag{9}$$

where $M_e$ is an amount of extrinsic parameters determined for a camera. $M_e$ may be an even number. For example, one coordinate defining a position of a camera and three angular coordinates defining orientation of a camera may be determined, and then, M may be selected such that $M=M_e/2$.

Referring to FIGS. 3-6, an example determination of the 3-tuples of coefficients (a, b, c) and (a', b', c') is illustrated.

Figure 3:
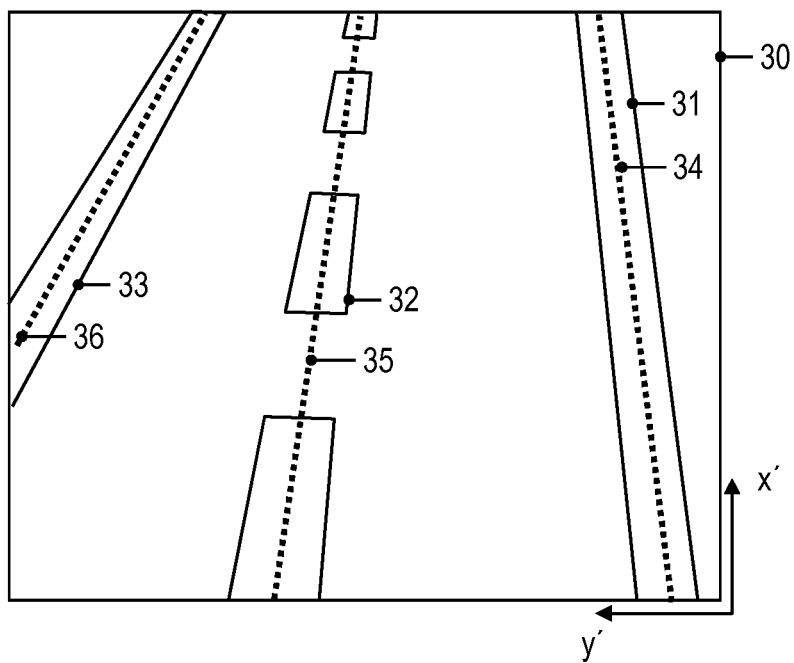
FIGS. 3-5 are schematic views of example images captured using an example camera of an example vehicle vision system.

FIG. 3 is a schematic view of an example image 30 captured by an example camera of an example vehicle vision system. Where the camera has optical components that give rise to a non-linear distortion, the image 30 may be a pre-processed image where non-linear distortion was reduced or corrected by the vehicle vision system, for example.

Road lane markings 31-33 may be included in the image. The road lane markings 31 and 33 are continuous. The road lane marking 32 is broken. The road lane markings 31-33 may be readily detected by the vehicle vision system performing object recognition. For example, edge detection schemes may be used.

The road lane marking 31 extends along a line 34 in the image plane. The line 34 may run through the middle or an edge of the road lane marking 31. The road lane marking 32 extends along a line 35. The line 35 may run through the middle or an edge of the road lane marking 32. The road lane marking 33 extends along a line 36. The line 36 may run through the middle or an edge of the road lane marking 33.

After image recognition, a first set of parameters defining line 34, another first set of parameters defining line 35, and another first set of parameters defining line 36 may be determined by the calibration system for example. The first set of parameters may be the coefficients of a bilinear equation in image space coordinates, as described by Equation (15), for example.

Figure 4:
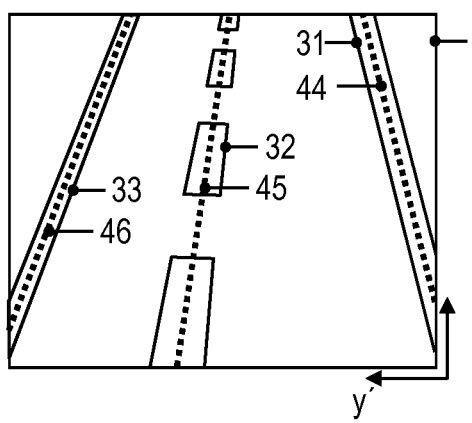
Figure 5:
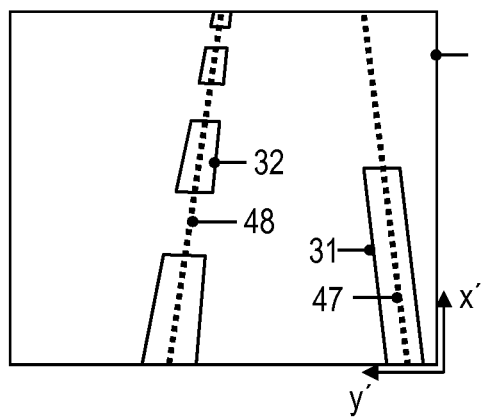

FIG. 4 shows another example image 40 of the road, and FIG. 5 shows yet another example image 41 of the road. The determination of a first set of parameters defining a line along which the road lane marking 31 extends may be performed for the line 34 along which the road lane marking 31 extends in the image 30, for line 44 along which the road lane marking 31 extends in the image 40, and/or for line 47 along which the road lane marking 31 extends in the image 41. The determination of a first set of parameters defining a line along which the road lane marking 32 extends may be performed for the line 35 along which the road lane marking 32 extends in the image 30, for line 45 along which the road lane marking 32 extends in the image 40, and/or for line 48 along which the road lane marking 32 extends in the image 41. The determination of a first set of parameters defining a line along which the road lane marking 33 extends may be performed for the line 36 along which the road lane marking 33 extends in the image 30 and/or for line 46 along which the road lane marking 33 extends in the image 40.

Where a road lane marking is included in more than one image, averaging of determined coefficients may be performed to enhance the calibration (described further below).

The second set of parameters may be determined based on a width of a road lane or widths of road lanes delimited by road lane markings (described further below). These widths may define a spacing of road lane markings in a transverse direction of the road. For example, the road lanes delimited by identified road lane markings may have equal widths. This may be the case for adjacent lanes on a highway, for example. This may also be the case for a lane provided for one traffic direction and another lane provided for another traffic direction on a road having two adjacent lanes.

The longitudinal direction of a road along which the vehicle may be travelling may be defined, by the calibration system for example, to be aligned with a coordinate axis of a world coordinate system of the vehicle. The direction in which road lane markings extend may be set to be the x-direction, for example. Then, lines along which the different road lane markings extend may be defined by:

$$y+(2\cdot k(i)+1)\cdot l/2+s=0. \tag{17}$$

In Equation (17), s denotes an offset of an origin of the vehicle coordinate system from the middle of a lane. This value may be estimated from the captured images, for example. Alternatively, s may be set to zero, thus assuming that the vehicle on average travels along the middle of a lane. In Equation (17), l is the width of a road lane. The factor k(i) is an integer that depends on road lane marking. For example, for a road lane marking that delimits one side of a lane on which the vehicle may be travelling, k(i)=−1, for example. For the road lane marking which delimits the other side of the lane on which the vehicle may be travelling, k(i)=0, for example. A road lane marking delimiting a lane adjacent to the one on which the vehicle may be travelling has k(i)=1 or k(i)=−2, for example.

The 3-tuple on the right-hand side of Equation (16) may then be expressed as:

$$\lambda_i \begin{pmatrix} 0 \\ 1 \\ -(2\cdot k(i)+1)\cdot \dfrac{l}{2}-s \end{pmatrix}. \tag{18}$$

Where $\lambda_i$ may be an arbitrary non-zero factor, accounting for a respective line remains invariant under multiplication of coefficients with the same non-zero factor. The calibration system for example, may select factor $\lambda_i$ according to a scaling factor of the 3-tuple on the left-hand side of Equation (16). Factor $\lambda_i$ may also be set to one.

Figure 6:
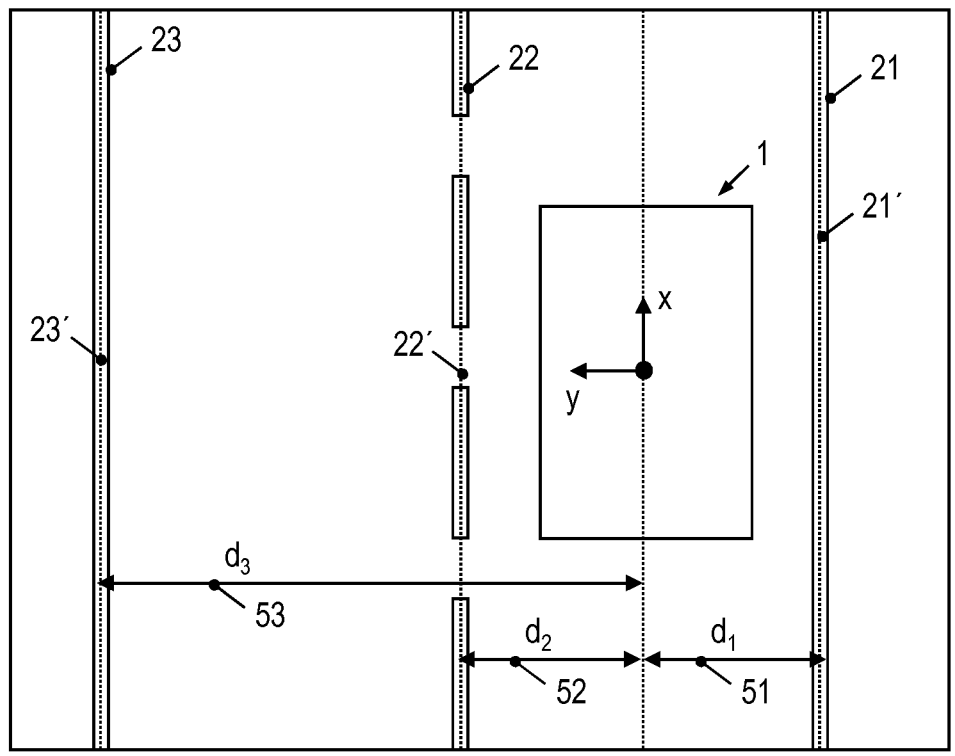
FIG. 6 is a top view of a road with an example vehicle positioned thereon.

FIG. 6 illustrates example parameters of lines along which road lane markings extend. As depicted, the vehicle 1 is driving along the middle a lane delimited by the road lane markings 21 and 22. The x-axis may extend in the longitudinal direction of the road, for example. The line along which the first road lane marking 21 extends may be offset from the x-axis by a value $d_1$ shown at 51, which may be given by Equation (17), where k(1)=−1 and s=0, for example. The line along which the second road lane marking 22 extends may be offset from the x-axis by a value $d_2$ shown at 52, which may be given by Equation (17), where k(2)=0 and s=0, for example. The line along which the road lane marking 23 extends may be offset from the x-axis by a value $d_3$ shown at 53, which may be given by Equation (17), where k(3)=1 and s=0.

Using Equation (16) for the three lines along which the road lane markings extend, the calibration system for example may determine:

$$\begin{pmatrix} h_{11} & h_{21} & h_{31} \\ h_{12} & h_{22} & h_{32} \\ h_{14} & h_{24} & h_{34} \end{pmatrix}\begin{pmatrix} a'_1 \\ b'_1 \\ c'_1 \end{pmatrix}=\begin{pmatrix} 0 \\ 1 \\ \dfrac{1}{2}\cdot l \end{pmatrix}, \tag{19}$$

$$\begin{pmatrix} h_{11} & h_{21} & h_{31} \\ h_{12} & h_{22} & h_{32} \\ h_{14} & h_{24} & h_{34} \end{pmatrix}\begin{pmatrix} a'_2 \\ b'_2 \\ c'_2 \end{pmatrix}=\begin{pmatrix} 0 \\ 1 \\ -\dfrac{1}{2}\cdot l \end{pmatrix}, \text{ and} \tag{20}$$

$$\begin{pmatrix} h_{11} & h_{21} & h_{31} \\ h_{12} & h_{22} & h_{32} \\ h_{14} & h_{24} & h_{34} \end{pmatrix}\begin{pmatrix} a'_3 \\ b'_3 \\ c'_3 \end{pmatrix}=\begin{pmatrix} 0 \\ 1 \\ -\dfrac{3}{2}\cdot l \end{pmatrix}. \tag{21}$$

By expanding Equations (19)-(21), a set of nine equations may be obtained. Because multiplication of a column vector that includes the coefficients for a line in the image plane by a non-zero factor leaves the line invariant, and because multiplication of a column vector that includes the coefficients for a line in the road plane by a non-zero factor leaves the line invariant, only six of the nine equations are linearly independent. Therefore, up to six extrinsic parameters may be determined from Equations (19)-(21). For example, both the position and the orientation of a camera of the vehicle vision system may be obtained by solving Equations (19)-(21) for the extrinsic parameters on which the matrix elements of the homography matrix depend.

If it may be not desired to determine all six extrinsic parameters from the linear mapping obtained for at least two road lane markings, the over-determined set equations may be solved in a conventional way. For example, $$\sum_{i=1}^{M} N\left[ H^T\begin{pmatrix} a'_i \\ b'_i \\ c'_i \end{pmatrix} - \begin{pmatrix} a_i \\ b_i \\ c_i \end{pmatrix} \right] \tag{4}$$

may be minimized, where N[•] denotes a vector norm. Where a least squares technique is used by the calibration system for example, $$\sum_{i=1}^{M} \left\| H^T\begin{pmatrix} a'_i \\ b'_i \\ c'_i \end{pmatrix} - \begin{pmatrix} a_i \\ b_i \\ c_i \end{pmatrix} \right\|^2 \tag{5}$$

may be minimized. For example, where orientation of a camera is to be determined, while the camera position is already known, it may be sufficient to use two road lane markings (M=2) and to determine angles such that Equation (5) becomes minimum.

Wither respect to the homography matrix, there may be a wide variety of representations for the matrix and corresponding definitions of extrinsic parameters.

For example, the camera matrix H may be defined in terms of successive rotations about z-, y-, and x-axis, followed by a translation and a projection, such as:

$$H_{3\times 4}=P\cdot T\cdot R_x\cdot R_y\cdot R_z, \tag{22}$$

where homogeneous coordinates are used. T, $R_x$, $R_y$ and $R_z$ may be matrices having four rows and four columns. T may be a translation matrix with homogeneous coordinates. $R_x$, $R_y$ and $R_z$ may be rotation matrices with homogeneous coordinates describing rotations around x-, y- and z-axes. P may be a projection matrix having three rows and four columns.

For Equation (22), the Tait-Bryan notation may be used. The angle for rotation about the z-axis (yaw angle) may be denoted by α, the angle for rotation about the y-axis (pitch angle) may be denoted by β, and the angle for rotation about the x-axis (roll angle) may be denoted by γ. Therefore, $$h_{11} = c_x \cdot \cos\beta \cdot \cos\alpha - f_x \cdot \sin\gamma \cdot \sin\beta \cdot \cos\alpha - f_x \cdot \cos\gamma \cdot \sin\alpha, \quad (23)$$

$$h_{12} = -c_x \cdot \cos\beta \cdot \sin\alpha + f_x \cdot \sin\gamma \cdot \sin\beta \cdot \sin\alpha - f_x \cdot \cos\gamma \cdot \cos\alpha, \quad (24)$$

$$h_{14} = c_x \cdot d_x - f_x \cdot d_y, \quad (25)$$

$$h_{21} = c_y \cdot \cos\beta \cdot \cos\alpha + f_y \cdot \cos\gamma \cdot \sin\beta \cdot \cos\alpha - f_y \cdot \sin\gamma \cdot \sin\alpha, \quad (26)$$

$$h_{22} = -c_y \cdot \cos\beta \cdot \sin\alpha - f_y \cdot \cos\gamma \cdot \sin\beta \cdot \sin\alpha - f_y \cdot \sin\gamma \cdot \cos\alpha, \quad (27)$$

$$h_{24} = c_y \cdot d_x - f_y \cdot d_z, \quad (28)$$

$$h_{31} = \cos\beta \cdot \cos\alpha, \quad (29)$$

$$h_{32} = -\cos\beta \cdot \sin\alpha, \quad (30)$$

and $$h_{34} = d_x. \quad (31)$$

In Equations (23)-(31), $c_x$ and $c_y$ denote coordinates of a principal point measured relative to the middle of the image plane, and $f_x$ and $f_y$ denote focal lengths. These parameters may be intrinsic parameters that may be known, for example from an initial calibration. The three angles α, β and γ may be rotation angles between the world and camera coordinate systems, for example. The three parameters $d_x$, $d_y$, and $d_z$ may be translations between the world and camera coordinate systems in the x-, y- and z-direction, respectively.

In one embodiment of the vehicle vision system, at least one of the extrinsic parameters may be determined based on the linear transformation of Equation (16). Further, for example, the six extrinsic parameters α, β and γ and $d_x$, $d_y$, and $d_z$ may be determined based on the linear transformation of Equation (16). Alternatively, $d_x$, $d_y$, and $d_z$ may be known and only the angles α, β and γ may be determined. Also, using the determined extrinsic parameters, the remaining matrix elements $h_{13}$, $h_{23}$ and $h_{33}$ of a full camera matrix, e.g., a full homography matrix having three rows and four columns, may be determined.

The representation of the homography matrix according to Equation (22) may be only one of a variety of representations. For example, Euler angles and corresponding rotations may be used instead of the rotations about z-, y-, and x-axes to define orientation of a camera relative to world coordinates.

Figure 7:
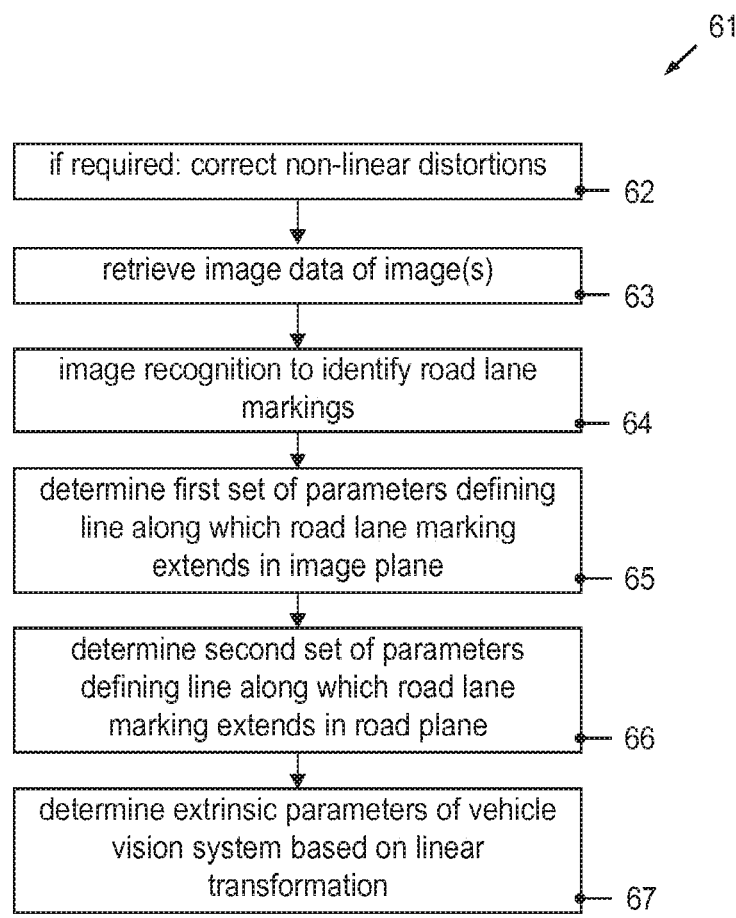
FIG. 7 is a flowchart of an example method for determining extrinsic parameters of an example vehicle vision system or an example aspect(s) of the vehicle vision system.

FIG. 7 is a flowchart of an example method 61 that may be performed by the processing unit of the vehicle vision system. Further, the processing unit may include or be coupled to the calibration system, and the calibration system in conjunction with the processing unit may perform the method 61. In the method 61, the extrinsic parameters of the vehicle vision system or of an aspect(s) of the vehicle vision system may be determined. The extrinsic parameters include at least an orientation of a camera relative to world coordinates. Further, the extrinsic parameters may be determined while the vehicle is moving.

At 62, where the camera may include optical components that give rise to a non-linear distortion, the non-linear distortion may be corrected. The non-linear distortion can be corrected based on intrinsic parameters of the camera determined in an initial calibration (e.g., an initial calibration performed by the calibration system).

At 63, image data representing one image or several images captured by the camera may be retrieved.

At 64, image recognition may be performed to identify road lane markings in the image. Furthermore, road lane markings that extend in parallel with the road plane may be used for further processing. The road lane markings may be identified, for example, based on whether or not they converge towards a common intersection point. A number of the road lane markings that may be used may be limited based on an amount of the extrinsic parameters determined. Alternatively or additionally, an amount of the extrinsic parameters may be modified with respect to an amount of the road lane markings that are available for calibration. For example, only the orientation of the camera may be determined where two road lane markings are identified. Both the orientation and the position of the camera may be determined where three or more road lane markings are identified.

At 65, a first set of parameters may be determined for one or more of the road lane markings. The first set of parameters may define the line along which a respective road lane marking extends in the image plane. The first set of parameters may be a 3-tuple of coefficients for an equation that may be bilinear with respect to image plane coordinates. The first set of parameters may include the coefficients of Equation (2), for example.

At 66, a second set of parameters may be determined for one or more of the road lane markings. The second set of parameters may define the line along which a respective road lane marking extends in the road plane. The second set of parameters may be a 3-tuple of coefficients for an equation that may be bilinear with respect to world coordinates. The second set of parameters may include the coefficients of Equation (3), for example.

The second set of parameters may be determined based on information related to width of a road lane that may be retrieved from a map database of a driver assistance system, for example. The road segment on which the vehicle may be located may be determined using on a position determination system of the vehicle, for example, in order to determine the road lane widths.

The road lane widths may be determined in any one of a variety of ways. For example, information on road lane widths may be stored in a map database, e.g., in the form of width values; and this information may be retrieved and used. Where no information on road lane widths is stored in a map database, information on a functional road class of a road may be retrieved from a map database. Further, a look-up table specifying road lane widths for various functional road classes may be used to identify the road lane width for a road segment. Alternatively, instead of using a look-up table, other means to associate functional road classes with road lane widths may be used.

At 67, extrinsic parameters of the camera may be determined based on a linear transformation. This transformation for all road lane markings, for which first and second sets of parameters have been determined, defines a mapping between the first set of parameters and the second set of parameters. The linear transformation may be defined by a matrix including matrix elements of a homography matrix. The matrix elements of the matrix may depend on the extrinsic parameters. The matrix elements may further depend on intrinsic parameters of the camera, which may be known. Further, the extrinsic parameters may be determined using any one of the techniques for determining extrinsic parameters described herein.

Varying road widths and/or an offset of the vehicle from a lateral middle axis of a road lane can be accounted for in a calibration procedure. The second set of parameters may be determined to allow a road lane width to vary.

Figure 8:
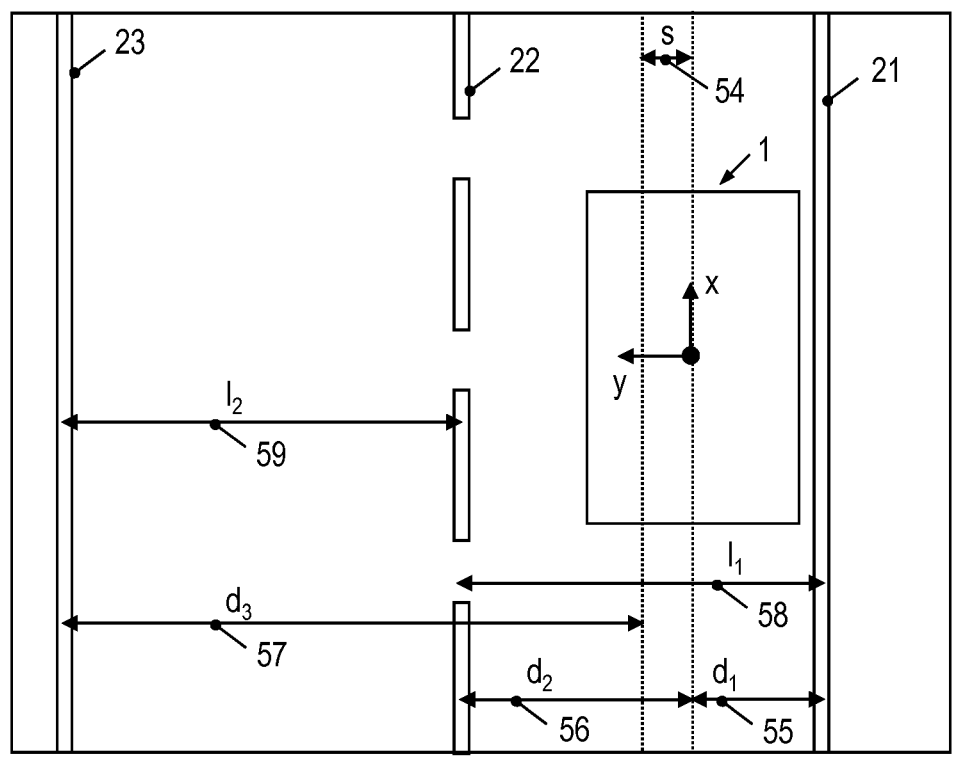
FIG. 8 is a top view of another road with an example vehicle positioned thereon.

FIG. 8 is a top view of another road with an example vehicle positioned thereon. The road lane markings 21 and 22 delimit a road lane that has a width $l_1$, shown at 58. Road lane markings 22 and 23 delimit another road lane having another width $l_2$, shown at 59. The middle of the vehicle, which defines an origin of a world coordinate system for the vehicle, may be offset from the lateral middle axis of the road lane by s indicated at 54.

Where the x-axis is assumed to be the axis along which the road lane markings extend, the second parameter set is determined for the road lane markings 21, 22, and 23, ai=0.

The other parameters for the line along which the road lane marking 21 extends in the road plane may be set to values $b_1$ and $c_1$ such that:

$$c_1/b_1 = l_1/2 - s, \quad (32)$$

where the lateral middle axis of the vehicle may be offset towards the road lane marking 21 by s. The right-hand side of Equation (32) represents the distance $d_1$ shown at 55.

The other parameters for the line along which the road lane marking 22 extends in the road plane may be set to values $b_2$ and $c_2$ such that:

$$c_2/b_2 = -l_1/2 - s, \quad (33)$$

where the lateral middle axis of the vehicle may offset away from the road lane marking 22 by s. The right-hand side of Equation (33) represents a negative of the distance $d_2$ shown at 56.

Other parameters for the line along which the first road lane marking 23 extends in the road plane may be set to values $b_3$ and $c_3$ such that:

$$c_3/b_3 = l_2 - l_1/2 - s, \quad (34)$$

where the lateral middle axis of the vehicle may be offset towards the road lane marking 23 by s, and where the road lane extending between road lane markings 23 and 22 has a width $l_2$ that may be different from a width $l_1$ of the lane extending between road lane markings 22 and 21. The right-hand side of Equation (34) represents the negative of the distance $d_3$ shown at 57.

Further, more than one image captured by the camera may be evaluated to determine the extrinsic parameters in the calibration procedure. In one embodiment of the vehicle vision system, tracking may be performed to monitor the position and orientation of a line along which a road lane marking extends in various images captured by the camera in a time-sequential manner.

Where a road lane marking is identified in one or more images captured in a time-sequential manner while the vehicle moves along a road, the vehicle vision system, via the calibration system, for example, may average parameters that define a line along which the road lane marking extends in the one or more images. This averaging may increase accuracy in determining the extrinsic parameters, for example.

Figure 9:
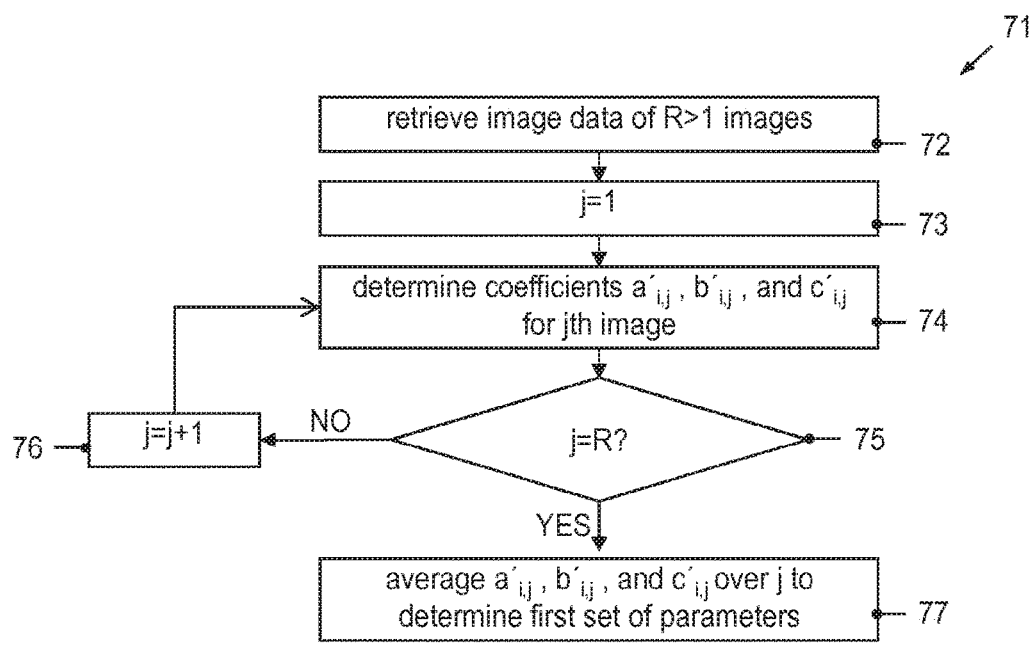
FIG. 9 is a flowchart of another example method that may be performed in conjunction with the method of FIG. 7.

FIG. 9 is a flowchart of an example method 71 of determining the first set of parameters for road lane marking (s) that may be present in one or more images. The method 71 may be performed by the processing unit of the vehicle vision system. Further, the processing unit may include or be coupled to the calibration system, and the calibration system in conjunction with the processing unit may perform the method 71. In the method 71, the extrinsic parameters may be determined. The extrinsic parameters include at least an orientation of a camera relative to world coordinates. Further, the extrinsic parameters may be determined while the vehicle is moving. Also, the procedure may be performed to implement steps 63-65 of method 61.

At 72, image data of the one or more images may be retrieved. A number of images may be denoted by R.

At 73, an iteration through the one or more images may be initiated by setting an image identifier j equal to one.

At 74, the coefficients $a'_{i,j}$, $b'_{i,j}$ and $c'_{i,j}$ of a bilinear equation may be determined such that a line along which an $i^{th}$ road lane marking extends in a $j^{th}$ image may be defined by $$a'_{i,j} \cdot x' + b'_{i,j} \cdot y' + c'_{i,j} = 0, \quad (35)$$

where x' and y' denote image plane coordinates.

At 75, the vehicle vision system, via the calibration system, for example, may verify whether the coefficients of the Equation (35) have already been determined for one or more of the one or more images. Where j<R, j may be incremented at 76 and then the method 71 returns to 74.

If the coefficients have been determined for one or more of the one or more images, the method 71 continues at 77. At 77, the coefficients obtained for the $i^{th}$ road lane marking for the R images may be combined to determine the first set of parameters for the $i^{th}$ road lane marking. For example, averaging may be performed such that:

$$a'_i = \Sigma_{j=1}^R a'_{i,j}/R, \quad (36)$$

$$b'_i = \Sigma_{j=1}^R b'_{i,j}/R, \quad (37)$$

and $$c'_i = \Sigma_{j=1}^R c'_{i,j}/R. \quad (38)$$

Weighted averages or similar techniques may be used.

Further, the determined first set of parameters may be used in determining the extrinsic parameters, e.g., based on the linear transformation as explained with reference to 67 of the method 61 of FIG. 7.

Tracking road lane markings in a plurality of images and/or averaging coefficients determined for the lines in different images may be performed for at least one of the road lane markings. The tracking and/or averaging may be performed for one or more of the road lane markings. The position of the vehicle shifts relative to the road while the plural images are captured.

Determining extrinsic parameters as described for various embodiments herein may be used to recalibrate the vehicle vision system while the vehicle is moving. This allows changes in the extrinsic parameters that occur over time to be determined and taken into account. The extrinsic parameters determined using one of the methods described herein may be used for a variety of purposes, such as controlling output of captured images via an optical output device, determining positions at which information may be overlaid on a captured image when outputting the captured image via a display device, and other driver assistance functions.

Figure 10:
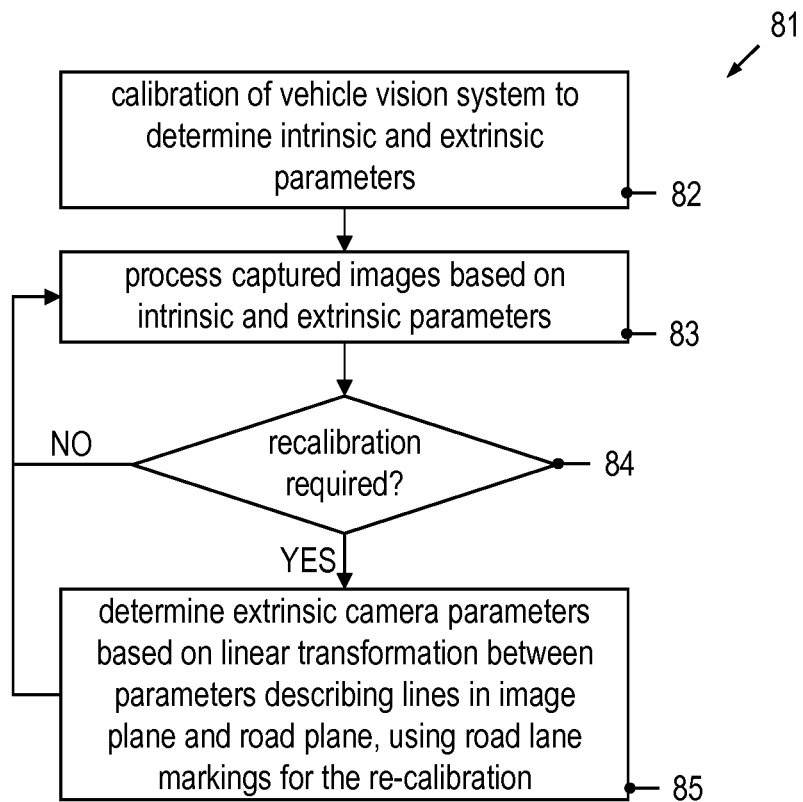
FIG. 10 is a flowchart of another example method performed by an example processing unit of an example vehicle vision system.

FIG. 10 is a flowchart of an example method 81 FIG. 10 performed by an example processing unit of an example vehicle vision system. Further, the processing unit may include or be coupled to the calibration system, and the calibration system in conjunction with the processing unit may perform the method 81.

At 82, an initial calibration of the vehicle vision system may be performed. The calibration at 82 may use dedicated markings positioned at predefined locations in a world coordinate system of the vehicle. The calibration at 82 may use road lane markings as markers. In the calibration at 82, both intrinsic and extrinsic parameters may be determined. Examples for an intrinsic parameter include one or more focal lengths. The intrinsic parameters may also include coordinates of a principal point, defining an offset between the principal point and the middle of an electro-optical sensor of a camera.

At 83, camera captured images may be processed during use of the vehicle vision system.

At 84, it may be determined whether a recalibration is to be performed. A recalibration may be performed in response to a user command, by the calibration system, for example. Alternatively or additionally, a recalibration may be performed automatically when a predetermined time interval has expired from a preceding calibration. Alternatively or additionally, a recalibration may be performed automatically where the vehicle vision system determines that processing of images based on prior extrinsic parameters no longer meets a predetermined quality criterion. In either one of these scenarios, a recalibration may be initiated only where it may be determined that the vehicle may be moving on a road segment for which information on road lane widths may be available or derivable (e.g., because such information may be included in a map database or because the information may be derived in other ways).

Where the vehicle vision system determines that no recalibration is involved, the previous extrinsic parameters continue to be used and the method 81 returns to 83.

Where the vehicle vision system determines that a recalibration may be involved, the method 81 proceeds to 85. At 85, the extrinsic parameters may be determined using road lane markings as markings. The extrinsic parameters may be determined based on a linear transformation which, for all of the road lane markings used in the recalibration, defines a mapping between a first set of parameters defining a line along which the road lane marking extends in the image plane and a second set of parameters defining a line along which the road lane marking extends in the road plane.

Methods and vehicle vision systems according to embodiments have been described with reference to the drawings. Modifications and alterations may be implemented in other embodiments. For example, while embodiments have been described in which a line in a road plane or in an image plane may be defined by a 3-tuple of coefficients of a bilinear equation, other parameterizations may be used for the lines. For example, a line in an image plane and/or a road plane may be parameterized by an angle defining its orientation and an offset defining its point of intersection with a coordinate system axis.

Further, while reference throughout has been made to the camera, additional sensors (e.g. multiple cameras) may be used in determining the extrinsic parameters. The determination may then be refined using one of the methods for determining extrinsic parameters described herein, for example.

Also, while road lane markings have exemplarily been illustrated as being continuous or broken lines, any type of road lane markings extending along the road may be used. For example, a road lane marking that terminates at a location of the road, captured by a camera, may be used by the calibration system for determining the extrinsic parameters. The road lane markings may also be based on an end of a wall or of a series of posts, for example.

Figure 11:
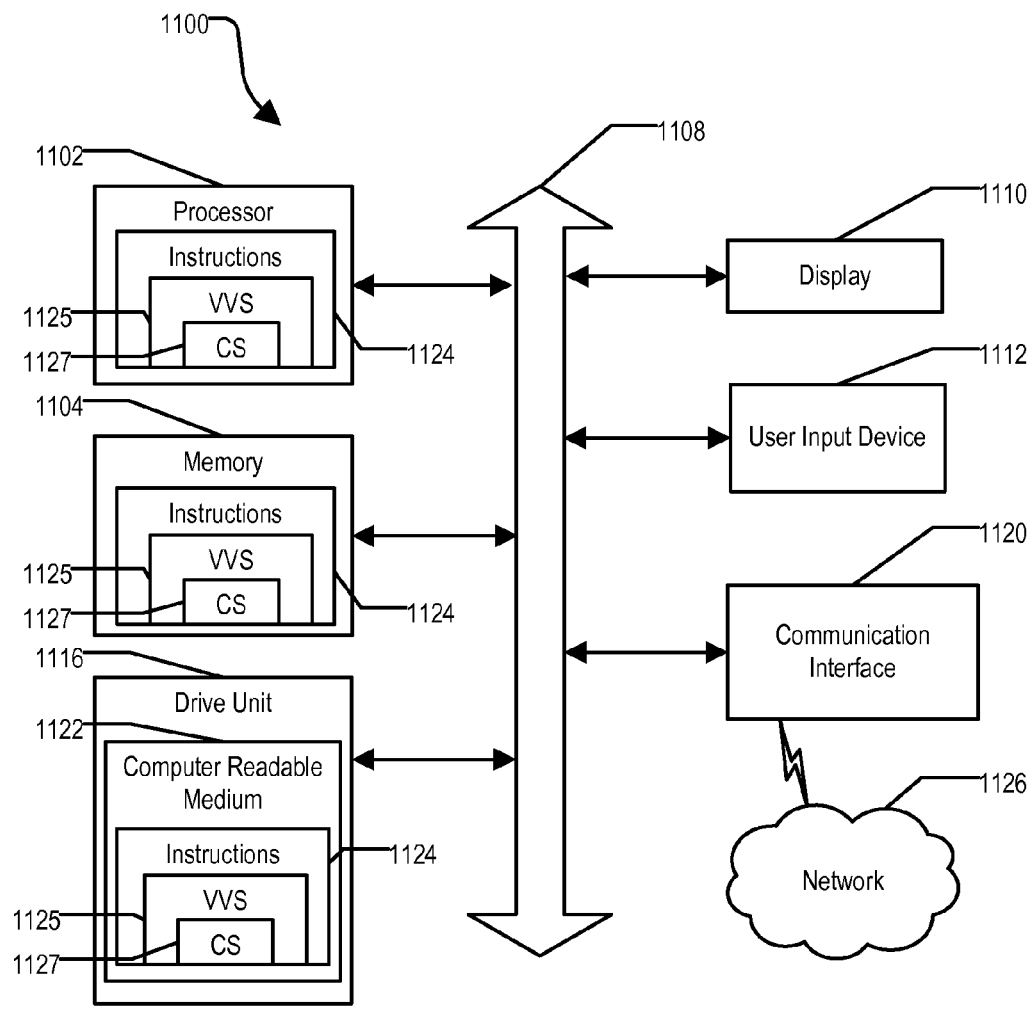
FIG. 11 shows a computer system.

Furthermore, the camera, the calibration system, or any other component of or related to the vehicle vision system may be or may include a portion or all of one or more computing devices of various kinds, such as the computer system 1100 in FIG. 11. The computer system 1100 may include a set of instructions that can be executed to cause the computer system 1100 to perform any one or more of the methods or computer based functions disclosed. The computer system 1100 may operate as a standalone device or may be connected, e.g., using a network, to other computer systems or peripheral devices.

In a networked deployment, the computer system 1100 may operate in the capacity of a server or as a client user computer in a server-client user network environment, as a peer computer system in a peer-to-peer (or distributed) network environment, or in various other ways. The computer system 1100 can also be implemented as or incorporated into various devices, such as various types of vehicle computer systems (e.g., Electronic/Engine Control Module, Powertrain Control Module, Transmission Control Module, Brake Control Module), a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. The computer system 1100 may be implemented using electronic devices that provide voice, audio, video or data communication. While a single computer system 1100 is illustrated, the term "system" may include any collection of systems or sub-systems that individually or jointly execute a set, or multiple sets, of instructions to perform one or more computer functions.

The computer system 1100 may include a processor 1102, such as a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually or programmed.

The term "module" may be defined to include a number of executable modules. The modules may include software, hardware or some combination thereof executable by a processor, such as processor 1102. Software modules may include instructions stored in memory, such as memory 1104, or another memory device, that may be executable by the processor 1102 or other processor. Hardware modules may include various devices, components, circuits, gates, circuit boards, and the like that are executable, directed, and/or controlled for performance by the processor 1102.

The computer system 1100 may include a memory 1104, such as a memory 1104 that can communicate via a bus 1108. The memory 1104 may be a main memory, a static memory, or a dynamic memory. The memory 1104 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1104 includes a cache or random access memory for the processor 1102. In alternative examples, the memory 1104 may be separate from the processor 1102, such as a cache memory of a processor, the system memory, or other memory. The memory 1104 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1104 is operable to store instructions executable by the processor 1102. The functions, acts or tasks illustrated in the figures or described may be performed by the programmed processor 1102 executing the instructions stored in the memory 1104. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 1100 may or may not further include a display unit 1110, such as a liquid crystal display (LCD), an organic light emitting diode (OLED), a flat panel display, a solid state display, a cathode ray tube (CRT), a projector, a printer or other now known or later developed display device for outputting determined information. The display 1110 may act as an interface for the user to see the functioning of the processor 1102, or specifically as an interface with the software stored in the memory 1104 or in the drive unit 1116.

The computer system 1100 may include an input device 1112 configured to allow a user to interact with any of the components of system 1100. The input device 1112 may be a number pad, a keyboard, or a cursor control device, such as a mouse, or a joystick, touch screen display, remote control or any other device operative to interact with the computer system 1100. A user of the calibration logic may input criteria or conditions to be considered by the logic, for example.

The computer system 1100 may include a disk or optical drive unit 1116. The disk drive unit 1116 may include a computer-readable medium 1122 in which one or more sets of instructions 1124 or software can be embedded. The instructions 1124 may embody one or more of the methods or systems described herein, such as a calibration system 1127 (e.g., the calibration system described above) of a vehicle vision system 1125 (e.g., the vehicle vision system described above). The calibration system 1127 and the logic described above may include software, hardware, firmware, or a combination thereof. For example, the calibration logic may include or be a part of computer-readable medium. The instructions 1124 may reside completely, or partially, within the memory 1104 and/or within the processor 1102 during execution by the computer system 1100. The memory 1104 and the processor 1102 also may include computer-readable media as discussed above.

The computer system 1100 may include computer-readable medium that includes instructions 1124 or receives and executes instructions 1124 responsive to a propagated signal so that a device connected to a network 1126 can communicate voice, video, audio, images or any other data over the network 1126. The instructions 1124 may be transmitted or received over the network 1126 via a communication port or interface 1120, and/or using a bus 1108. The communication port or interface 1120 may be a part of the processor 1102 or may be a separate component. The communication port 1120 may be created in software or may be a physical connection in hardware. The communication port 1120 may be configured to connect with a network 1126, external media, the display 1110, or any other components in system 1100, or combinations thereof. The connection with the network 1126 may be a physical connection, such as a wired Ethernet connection or may be established wirelessly as discussed later. The additional connections with other components of the system 1100 may be physical connections or may be established wirelessly. The network 1126 may alternatively be directly connected to the bus 1108.

The network 1126 may include wired networks, wireless networks, Ethernet AVB networks, or combinations thereof. The wireless network may be a cellular telephone network, an 802.11, 802.16, 802.20, 802.1Q or WiMax network. Further, the network 1126 may be a public network, such as the Internet, a private network, such as an intranet, or combinations thereof, and may utilize a variety of networking protocols now available or later developed including, but not limited to TCP/IP based networking protocols. One or more components of the calibration logic may communicate with each other by or through the network 1126.

The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. The computer system 1100 may include any one or more of a computer-readable medium or a distribution medium and other equivalents and successor media, in which data or instructions may be stored.

In alternative examples, dedicated hardware implementations, such as application specific integrated circuits, programmable logic arrays and other hardware devices, may be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. The computer system 1100 encompasses software, firmware, and hardware implementations.

The system described may be implemented by software programs executable by a computer system. Implementations can include distributed processing, component/object distributed processing, and parallel processing. Alternatively, virtual computer system processing can be constructed to implement various parts of the system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computer implemented method of determining extrinsic parameters for a vehicle vision system, the method comprising:

processing an image of a road captured by a camera to identify a first road lane marking and a second road lane marking in the image, where the first road lane marking and the second road lane marking are two road lane markings that extend parallel to each other;

determining, for at least one of the two road lane markings:

a first set of parameters defining an orientation and a position of a line along which the at least one of the two road lane markings extends in an image plane, where the determining the first set of parameters comprises determining parameter values $a'_i$, $b'_i$ and $c'_i$, such that the line along which the at least one of the two road lane markings extends in the image plane is defined by $$a'_i \cdot x' + b'_i \cdot y' + c'_i = 0,$$

where i denotes a road lane marking identifier and x' and y' denote coordinates in the image plane; and a second set of parameters defining an orientation and a position of a line along which the at least one of the two road lane markings extends in a road plane, where the second set of parameters is determined based on information related to spacing of the two road lane markings, wherein at least one of the first set of parameters and the second set of parameters includes coefficients of a bilinear equation;

identifying a linear transformation which, for at least one of the two road lane markings, defines a mapping between the first set of parameters and the second set of parameters, where the identifying the linear transformation comprises determining matrix elements of a homographs matrix; and establishing the extrinsic parameters based on the identified linear transformation, where the established extrinsic parameters include an orientation of the camera with respect to a vehicle coordinate system.

2. The method of claim 1, where the matrix elements of the homography matrix are determined such that $$H^T \vec{p}'_i$$

approximates $\vec{p}_i$ for i=1, ..., M, where i denotes a road lane marking identifier, M denotes a count of the two road lane markings, H denotes the homography matrix that comprises three rows and three columns, T denotes a matrix transposition, $\vec{p}'_i$ denotes a 3-tuple of the first set of parameters identified for an $i^{th}$ road lane marking, and $\vec{p}_i$ denotes a 3-tuple of the second set of parameters identified for the $i^{th}$ road lane marking.

3. The method of claim 1, where the determining the second set of parameters comprises determining parameter values $a_i$, $b_i$, and $c_i$, such that the line along which the at least one of the two road lane markings extends in the road plane is defined by $$a_i \cdot x + b_i \cdot y + c_i = 0,$$

where x and y denote coordinates in the road plane.

4. The method of claim 3, where the matrix elements of the homography matrix are determined based on $$N\left[H^T \begin{pmatrix} a'_i \\ b'_i \\ c'_i \end{pmatrix} - \begin{pmatrix} a_i \\ b_i \\ c_i \end{pmatrix}\right],$$

for i=1, ..., M, where N[•] denotes a vector norm, where i denotes a road lane marking identifier, M denotes a count of the two road lane markings, H denotes the homography matrix that comprises three rows and three columns, and T denotes a matrix transposition.

5. The method of claim 3, where the matrix elements of the homography matrix may be determined such that $$\sum_{i=1}^{M} \left\| H^T \begin{pmatrix} a'_i \\ b'_i \\ c'_i \end{pmatrix} - \begin{pmatrix} a_i \\ b_i \\ c_i \end{pmatrix} \right\|^2$$

is minimized.

6. The method of claim 3, where, for at least one of the two road lane markings, one of the parameter values $a_i$ or $b_i$ is set equal to zero, and a quotient of $c_i$ and the other one of the parameter values $a_i$ or $b_i$ is set based on the information related to spacing of the two road lane markings.

7. The method of claim 6, where, for at least one of the two road lane markings, the quotient of $c_i$ and the other one of the parameter values $a_i$ or $b_i$ is set to $$(2 \cdot k(i)+1) \cdot l/2 + s,$$

where k(i) denotes an integer number that depends on the road lane marking identifier, l denotes a respective road lane width, and s denotes an offset from a middle longitudinal axis of the road lane that is independent of the road lane marking identifier.

8. The method of claim 1, where the processing the image includes identifying a third road lane marking that extends parallel to the first and the second road lane markings.

9. The method of claim 1, where a count M of the two road lane markings and a count $M_e$ of extrinsic parameters that are to be determined fulfil $M_e \leq 2 \cdot M$.

10. The method of claim 1, where the determining the second set of parameters comprises determining a vehicle position and retrieving information on a road lane width from a map database based on a determined vehicle position.

11. The method of claim 1, where, for at least one of the two road lane markings, the line along which the road lane marking extends in the image plane is determined for multiple images of the road, and parameters defining orientations and positions for two or more of the multiple images of the road are averaged to determine the first set of parameters.

12. A calibration system for determining extrinsic parameters of a vehicle vision system comprising:
a processor;
a non-transient memory device in communication with the processor;
processor executable instructions stored in the memory device that when executed by the processor are configured to:
process data regarding a road sensed by a sensor to identify a first road lane marking and a second road lane marking, where the first road lane marking and the second road lane marking are two road lane markings that extend parallel to each other;
determine, for at least one of the two road lane markings:
a first set of parameters defining an orientation and a position of a line along which the at least one of the two road lane markings extends in an image plane, where the determining the first set of parameters comprises determining parameter values $a'_i$, $b'_i$ and $c'_i$, such that the line along which the at least one of the two road lane markings extends in the image plane is defined by $$a'_i x' + b'_i y' + c'_i = 0,$$

where i denotes a road lane marking identifier and x' and y' denote coordinates in the image plane; and
a second set of parameters defining an orientation and position of a line along which the at least one of the two road lane markings extends in a road plane, where the second set of parameters is determined based on information related to spacing of the two road lane markings;
identify a linear transformation which, for at least one of the two road lane markings, defines a mapping between the first set of parameters and the second set of parameters; and
establish the extrinsic parameters based on the identified linear transformation, where the established extrinsic parameters include an orientation of the sensor with respect to a vehicle coordinate system.

13. The system of claim 12, where a homography matrix defines the linear transformation.

14. The system of claim 12, where a bilinear equation defines coordinates of the road plane.

15. The system of claim 12, where a bilinear equation defines coordinates of the image plane.

16. The system of claim 12, where the orientation of the sensor comprises a yaw angle, a pitch angle, and a roll angle.

17. A computer implemented method of determining extrinsic parameters for a vehicle vision system, the method comprising:
processing an image of a road captured by a camera to identify a first road lane marking and a second road lane marking in the image, where the first road lane marking and the second road lane marking are two road lane markings that extend parallel to each other;
determining, for at least one of the two road lane markings:
a first set of parameters defining an orientation and a position of a line along which the at least one of the two road lane markings extends in an image plane, where the determining the first set of parameters comprises determining parameter values $a'_i$, $b'_i$ and $c'_i$, such that the line along which the at least one of the two road lane markings extends in the image plane is defined by $$a'_i x' + b'_i y' + c'_i = 0,$$

where i denotes a road lane marking identifier and x' and y' denote coordinates in the image plane; and
a second set of parameters defining an orientation and a position of a line along which the at least one of the two road lane markings extends in a road plane, where the second set of parameters is determined based on information related to spacing of the two road lane markings;
identifying, by at least determining matrix elements of a homography matrix, a linear transformation which, for at least one of the two road lane markings, defines a mapping between the first set of parameters and the second set of parameters; and
establishing the extrinsic parameters based on the identified linear transformation, where the established extrinsic parameters include an orientation of the camera.

18. The method of claim 17,
where a first bilinear equation defines coordinates of the road plane and a second bilinear equation defines coordinates of the image plane,
where, for at least one of the two road lane markings, a first parameter of the first bilinear equation is set equal to zero, and a quotient and a second parameter of the first bilinear equation is set based on the information related to spacing of the two road lane markings,
where, for at least one of the two road lane markings, the quotient and the second parameter are set to $$(2 \cdot k(i)+1) \cdot l/2 + s, \text{ and}$$

where k(i) denotes an integer number that depends on a road lane marking identifier, l denotes a respective road lane width, and s denotes an offset from a middle longitudinal axis of a respective road lane that is independent of the road lane marking identifier.

19. The system of claim 12, wherein at least one of the first set of parameters and the second set of parameters includes coefficients of a bilinear equation.

20. The method of claim 17, wherein at least one of the first set of parameters and the second set of parameters includes coefficients of a bilinear equation.

* * * * *